US010601226B2

United States Patent
Gurunathan et al.

(10) Patent No.: US 10,601,226 B2
(45) Date of Patent: Mar. 24, 2020

(54) ADVANCED UNINTERRUPTABLE POWER MODULE CONTROLLER AND METHOD OF OPERATING SAME

(71) Applicant: BLOOM ENERGY CORPORATION, Sunnyvale, CA (US)

(72) Inventors: Ranganathan Gurunathan, Bangalore (IN); Arne Ballantine, Palo Alto, CA (US); Prasad Pmsvvsv, Sunnyvale, CA (US); Vishal Anand Gopalakrishnan, Bangalore (IN); Saravanakumar Narayanasamy, Bangalore (IN); Badrinarayanan Thiruvengadaswamy, Bangalore (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 89 days.

(21) Appl. No.: 15/945,159

(22) Filed: Apr. 4, 2018

(65) Prior Publication Data

US 2019/0312432 A1    Oct. 10, 2019

(51) Int. Cl.
*H02J 3/32* (2006.01)
*H01M 8/04858* (2016.01)
(Continued)

(52) U.S. Cl.
CPC ............. *H02J 3/32* (2013.01); *H01M 8/0494* (2013.01); *H01M 8/04604* (2013.01);
(Continued)

(58) Field of Classification Search
CPC .. H02J 3/32; H02J 3/387; H02J 3/386; H01M 8/04604; H01M 8/0494; H01J 9/062
(Continued)

(56) References Cited

U.S. PATENT DOCUMENTS

| 7,583,050 B2 | 9/2009 | Sugiura et al. |
| 7,705,490 B2 | 4/2010 | Srinivasan et al. |

(Continued)

FOREIGN PATENT DOCUMENTS

| EP | 2360766A2 A2 | 8/2011 |
| KR | 1020140039511 A | 4/2014 |
| KR | 1020140100671 A | 8/2014 |

OTHER PUBLICATIONS

International Search Report and Written Opinion of the International Searching Authority for International Patent Application No. PCT/US2019/013135, dated Apr. 30, 2019, 9 pages.

*Primary Examiner* — Daniel Kessie
*Assistant Examiner* — Swarna N Chowdhuri
(74) *Attorney, Agent, or Firm* — The Marbury Law Group, PLLC

(57) ABSTRACT

A method and apparatus for parallel operation of multiple power sources including one fuel cell power source. The apparatus includes a droop controller master communicatively connected to the multiple power sources and configured to measure a load demand for the multiple power sources, a first droop controller slave communicatively connected to the droop controller master and to a first fuel cell power source, the first droop controller configured to calculate a first droop profile for the first fuel cell power source, a second droop controller slave communicatively connected to the droop controller master and to a second power source, and a first inverter, electrically connected to the first fuel cell power source and communicatively connected to the first droop controller slave, and configured to output power according to a first droop profile.

20 Claims, 7 Drawing Sheets

(51) Int. Cl.
  *H01M 8/04828* (2016.01)
  *H02J 3/38* (2006.01)
  *H02J 9/06* (2006.01)
  *H01M 8/04537* (2016.01)

(52) U.S. Cl.
  CPC ......... *H01M 8/04932* (2013.01); *H02J 3/387* (2013.01); *H02J 9/062* (2013.01); *H02J 3/383* (2013.01); *H02J 3/386* (2013.01)

(58) Field of Classification Search
  USPC .......................................................... 307/52
  See application file for complete search history.

(56) References Cited

U.S. PATENT DOCUMENTS

| | | | |
|---|---|---|---|
| 7,713,649 B2 | 5/2010 | Hickey et al. | |
| 7,974,106 B2 | 7/2011 | Gurunathan et al. | |
| 8,232,676 B2 | 7/2012 | Gurunathan et al. | |
| 8,263,276 B1 | 9/2012 | Gurunathan et al. | |
| 8,288,891 B2 | 11/2012 | Ballantine et al. | |
| 8,535,836 B2 | 9/2013 | Ballantine et al. | |
| 8,624,549 B2 | 1/2014 | Sridhar et al. | |
| 8,872,392 B1 | 10/2014 | Gurunathan et al. | |
| 8,970,176 B2 | 3/2015 | Ballantine et al. | |
| 9,106,098 B2 | 8/2015 | Srinivasan et al. | |
| 9,214,812 B2 | 12/2015 | Ballantine et al. | |
| 9,362,815 B2 | 6/2016 | Gurunathan et al. | |
| 9,639,130 B2 | 5/2017 | Gurunathan et al. | |
| 2008/0280175 A1 | 11/2008 | Gurunathan et al. | |
| 2010/0013317 A1 | 1/2010 | Ballantine et al. | |
| 2012/0098336 A1 | 4/2012 | Gurunathan et al. | |
| 2012/0146587 A1 | 6/2012 | Srinivasan et al. | |
| 2012/0267952 A1* | 10/2012 | Ballatine | H02J 1/102 307/26 |
| 2012/0326504 A1 | 12/2012 | Ballantine et al. | |
| 2012/0326516 A1 | 12/2012 | Gurunathan et al. | |
| 2013/0238151 A1 | 9/2013 | Vaum et al. | |
| 2014/0009003 A1 | 1/2014 | Ballantine et al. | |
| 2015/0288220 A1 | 11/2015 | Gurunathan et al. | |
| 2017/0005480 A1 | 1/2017 | Ballantine et al. | |
| 2017/0338502 A1 | 11/2017 | Pmsvvsv et al. | |
| 2018/0219379 A1* | 8/2018 | Henninger | H02J 3/28 |
| 2018/0226799 A1* | 8/2018 | Baker | H02J 3/1892 |
| 2019/0181648 A1* | 6/2019 | Zhou | G05B 19/042 |

* cited by examiner

US 10,601,226 B2

ADVANCED UNINTERRUPTABLE POWER MODULE CONTROLLER AND METHOD OF OPERATING SAME

BACKGROUND

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks. The number of individual fuel cells which make up fuel cell system can be based on the amount of electrical power which fuel cell system is intended to generate. An exemplary fuel system is described in U.S. Pat. No. 7,705,490 entitled Ripple Cancellation, the disclosure of which is incorporated herein by reference in its entirety.

Fuel cells generate power that is converted in a fuel cell power conversion system, also known as a power conditioning system. A power conversion system is a system that alters the characteristics of power produced by a source in some way. For the case of fuel cells, which generate DC (direct current) power, this can mean the conversion of the DC power to different (e.g., higher) voltage and/or current levels, the conversion to AC (alternating current) power with a particular RMS (root mean squared) voltage, the generation of three-phase AC power, or all of the above. Typically, a change in the voltage level of a DC source can be accomplished using a DC/DC (direct current/direct current) converter, whereas the change from DC to AC is accomplished using a DC/AC (direct current/alternating current) converter or inverter.

SUMMARY

According to one embodiment, a method of parallel operation of multiple power sources comprises measuring, by a droop controller master, a load demand for the multiple power sources, receiving, by a first droop controller slave from the droop controller master, the load demand for the multiple power sources, determining, by the first droop controller slave, a power capacity of a first fuel cell power source of the multiple power sources, calculating, by the first droop controller slave, at least one of a first slope and a first no load set point for a first droop profile for the first fuel cell power source using the load demand for the multiple power sources and the power capacity of the first fuel cell power source, wherein the first droop profile and at least a second droop profile for a second power source provide for all of the load demand for the multiple power sources, and configuring a first inverter for the first fuel cell power source to output power according to the first droop profile.

According to another embodiment, an apparatus for parallel operation of multiple power sources comprises a droop controller master communicatively connected to the multiple power sources and configured to measure a load demand for the multiple power sources, a first droop controller slave communicatively connected to the droop controller master and to a first fuel cell power source of the multiple power sources, the first droop controller configured to calculate a first droop profile for the first fuel cell power source, a second droop controller slave communicatively connected to the droop controller master and to a second power source, and a first inverter, electrically connected to the first fuel cell power source and communicatively connected to the first droop controller slave, and configured to output power according to a first droop profile.

DETAILED DESCRIPTION

In large systems in which uninterruptable power modules (UPM) and/or multiple power sources are used, the balance of power of the overall system may be managed by controlling the uninterruptable power modules and/or multiple power sources to achieve a particular objective of a power supply application, to balance the load between uninterruptable power modules with paralleled inputs and outputs, and to change the balance in response to changes in equipment status, to load requirements, and other factors. An example uninterruptable power module is described in U.S. Pat. No. 9,106,098 filed on Nov. 14, 2011, entitled "Fuel Cell System with Grid Independent Operation and DC Microgrid Capability," herein incorporated by reference in its entirety.

In some embodiments of the present disclosure, additional droop controller slaves may be added for each power source of multiple power sources. A droop controller master coordinates and controls the droop controller slaves. In some other embodiments, the droop profiles (e.g., droop profile slope and/or no load set point) for different power sources that power the same load and which use the same droop controller master may be different depending on the state of each power source of the plural power sources.

Figure 1:
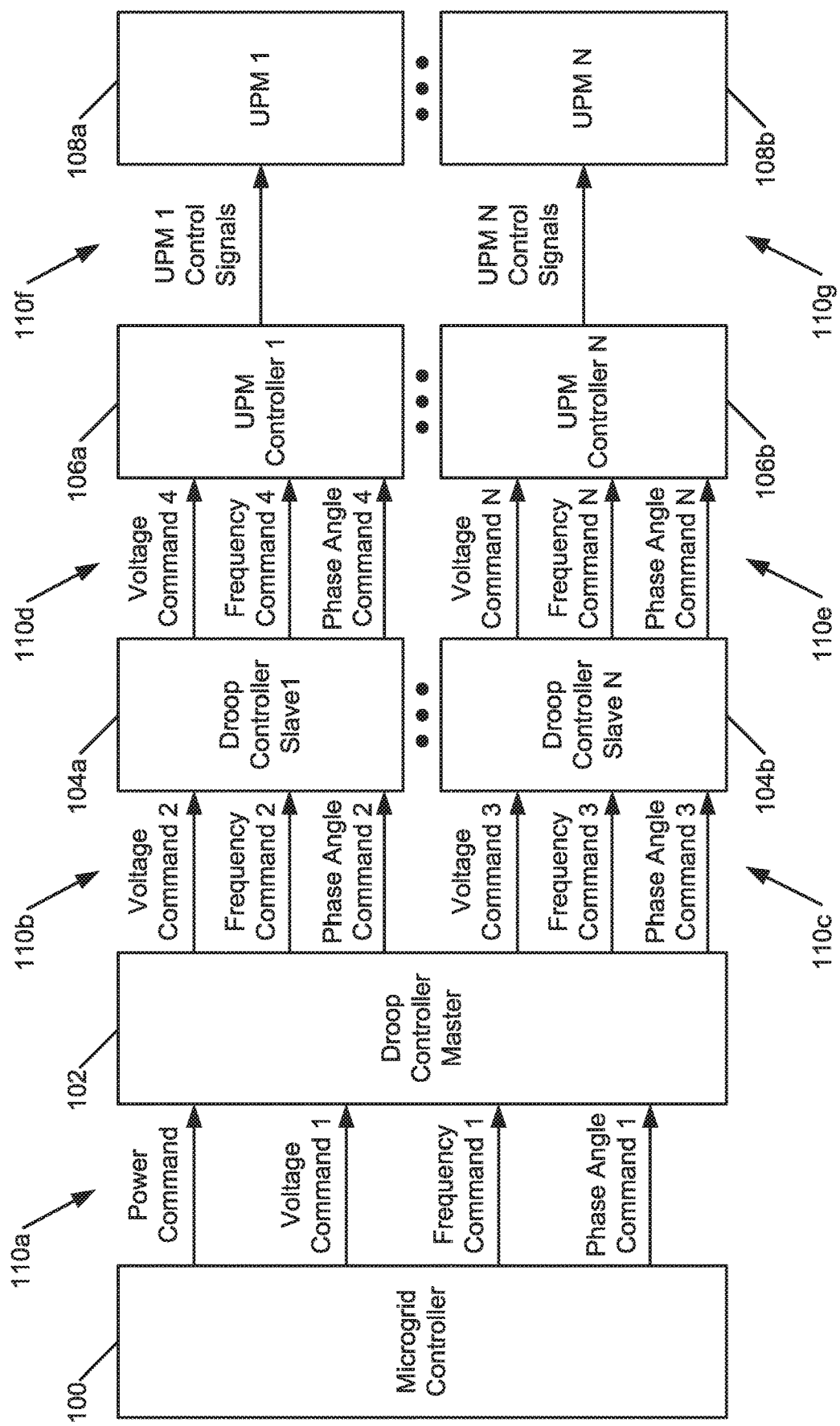
FIG. 1 is a block diagram illustrating a network of controllers having paralleled inputs and paralleled outputs for a fuel cell power generation system according to an embodiment.

Referring to FIG. 1, a network of controllers may have paralleled inputs and paralleled outputs for a fuel cell power generation system according to an embodiment. The network of controllers may include a microgrid controller 100, any number droop controller masters 102, any number of droop controller slaves 104a, 104b, and any number of uninterruptable power module controllers 106a, 106b. Each of the controllers 100, 102, 104a, 104b, 106a, 106b, may be communicatively connected via any number of wired or wireless communication connections (called "communication busses" or "busses" herein) 110a, 110b, 110c, 110d, 110e, which may include paralleled inputs and paralleled outputs and may be configured for high speed or low speed communications.

In various embodiments, the microgrid controller 100 may be communicatively connected to the droop controller master 102 via a first communication bus 110a. The microgrid controller 100 may be configured to monitor and control load power requirements (also referred to as load demand) and power source responses of a microgrid, such as the microgrid described further here with reference to FIG. 3. Monitoring and controlling power source responses may include monitoring and controlling power source responses for multiple distributed power sources as a collective unit for any number of loads of the microgrid. The distributed power sources may include any combination of any number of fuel cell systems, diesel generators, grid connections, microturbines, photovoltaic generators, wind generators, etc. Based on monitored, received, calculated, and/or predetermined criteria for satisfying a load demand, the microgrid controller 100 may determine set points for power, voltage, frequency, and/or phase angle requirements for the power source response to the load demand. The microgrid controller 100 may produce command signals indicating the set points for power, voltage, frequency, and/or phase angle for the power source response to the load demand, including a power command, a voltage command (voltage command 1), a frequency command (frequency command 1), and/or a phase angle command (phase angle command 1). The microgrid controller 100 may send the command signals to the droop controller master 102 via the first communication bus 110a. In various embodiments, the microgrid controller 100 may send a command signal to the droop controller master 102 in parallel with at least one other command signal.

In various embodiments, the droop controller master 102 may be communicatively connected to a first droop controller slave (droop controller slave 1) 104a via a second communication bus 110b, and communicatively connected to a second droop controller slave (droop controller slave N) 104b via a third communication bus 110c. The droop control master 102 may be configured to monitor and control power source responses for each of the power sources of the microgrid. Monitoring and controlling power source responses may include balancing power source responses among multiple distributed power sources. The droop controller master 102 may receive the command signals from the microgrid controller 100 via the communication bus 110a. In various embodiments, the droop controller master 102 may receive a command signal from the microgrid controller 100 in parallel with at least one other command signal.

The droop controller master 102 may be configured to measure active power, reactive power, and/or harmonic power supplied from the distributed power sources of the microgrid. The droop controller master 102 may be configured to use the measured active power, reactive power, and/or harmonic power to calculate set points for voltage, frequency, and/or phase angle of the various power sources to satisfy the command signals of the microgrid controller 100 and the load demand. In various embodiments, the droop controller master 102 may receive active power, reactive power, and/or harmonic power measurements from a droop controller slave 104a, 104b, via the second or third communication bus 110b, 110c, and incorporate the received measurements in and/or use the received measurements as the droop controller master's measured active power, reactive power, and/or harmonic power supplied from the distributed power sources of the microgrid.

Using the droop controller master's measured active power, reactive power, and/or harmonic power, the droop controller master 102 may produce command signals indicating the set points for voltage, frequency, and/or phase angle for the power source response to the load demand, including a voltage command, a frequency command, and/or a phase angle command, as described further herein. The droop controller master 102 may send the command signals to controllers for and/or directly to the various distributed power sources, and/or to the droop controller slaves 104a, 104b, for multiple uninterruptable power modules of a fuel cell power source via the second and/or third communication busses 110b, 110c. For example, the droop controller master 102 may produce and send a voltage command (voltage command 2), a frequency command (frequency command 2), and/or a phase angle command (phase angle command 2) to the first droop controller slave 104a, and produce and send a voltage command (voltage command 3), a frequency command (frequency command 3), and/or a phase angle command (phase angle command 3) to the second droop controller slave 104b. In various embodiments, the droop controller master 102 may send a command signal to the controllers for and/or directly to the various distributed power sources, and/or to the droop controller slaves 104a, 104b in parallel with at least one other command signal. In various embodiments, the droop controller master 102 may send the measured active power, reactive power, and/or harmonic power supplied from the distributed power sources of the microgrid to the microgrid controller 100 via the first communication bus 110a in parallel with at least one sent and/or received command signal.

In various embodiments, the droop controller slaves 104a, 104b, may be communicatively connected to the uninterruptable power module controllers 106a, 106b, via communication busses 110d, 110e. For example, the first droop controller slave 104a may be communicatively connected to a first uninterruptable power module controller (UPM controller 1) 106a via a fourth communication bus 110d, and the second droop controller slave 104b may be communicatively connected to a second uninterruptable power module controller (UPM controller N) 106b via a fifth communication bus 110e. The droop controller slaves 104a, 104b, may be configured to monitor and control power source responses for respective power sources of the microgrid, such as any number of fuel cell power sources containing one or more fuel cell systems. Monitoring and controlling power source responses may include balancing power source responses among the multiple respective power sources. The droop controller slaves 104a, 104b, may receive the command signals from the droop controller master 102 via the second and/or third communication busses 110b, 110c. In various embodiments, the droop controller slaves 104a, 104b, may receive a command signal from the droop controller master 102 in parallel with at least one other command signal.

The droop controller slaves 104a, 104b, may be configured to measure active power, reactive power, and/or harmonic power supplied from the respective power sources of the microgrid. The droop controller slaves 104a, 104b, may be configured to use the measured active power, reactive power, and/or harmonic power to calculate set points for voltage, frequency, and/or phase angle of their respective power sources to satisfy the command signals of the droop controller master 102 and the load demand. In various embodiments, the droop controller slaves 104a, 104b, may receive active power, reactive power, and/or harmonic power measurements from an uninterruptable power module controller 106a, 106b, via the fourth or fifth communication bus 110d, 110e, and incorporate the received measurements in and/or use the received measurements as the droop controller slaves' measured active power, reactive power, and/or harmonic power supplied from the distributed power sources of the microgrid.

Using the droop controller slaves' measured active power, reactive power, and/or harmonic power, the droop controller slaves 104a, 104b, may produce command signals indicating the set points for voltage, frequency, and/or phase angle for their respective power source response to the load demand, as described further herein. For example, the first droop controller slave 104a may produce and send command signals for the first uninterruptable power module controller 106a, including a voltage command (voltage command 4), a frequency command (frequency command 4), and/or a phase angle command (phase angle command 4), and the second droop controller slave 104b may produce and send command signals for the second uninterruptable power module contoller 106b, including a voltage command (voltage command N), a frequency command (frequency command N), and/or a phase angle command (phase angle command N). The droop controller slaves 104a, 104b, may send the command signals to their respective uninterruptable power module controllers 106a, 106b, for multiple uninterruptable power modules 108a, 108b, of a fuel cell power source via the fourth and/or fifth communication busses 110d, 110e. In various embodiments, the droop controller master 102 may send a command signal to the controllers for and/or directly to the various distributed power sources, and/or to the droop controller slaves 104a, 104b in parallel with at least one other command signal. In various embodiments, the droop controller slaves 104a, 104b, may send the measured active power, reactive power, and/or harmonic power supplied from fuel cell power source to the droop controller master 102 via the second and/or third communication busses 110b, 110c, in parallel with at least one sent and/or received command signal.

The droop controller master 102 and the droop controller slaves 104a, 104b, as discussed herein, may be configured to measure active power, reactive power, and/or harmonic power of their associated power sources, and calculate set points for voltage, frequency, and/or phase angle for their associated power sources to balance the power response from each associated power source to a load demand. Each of the droop controller master 102 and the droop controller slaves 104a, 104b, may implement a function to calculate the set points for their associated power sources. The frequency set point may be calculated as a function $f(t)=F(F_0, P_{ref}, P_{meas})$, in which t is a time, $F_0$ is a base frequency value, $P_{ref}$ is a reference active power value, and $P_{meas}$ is the measured active power. The is voltage set point may be calculated as a function $v(t)=F(V_0, Q_{ref}, Q_{meas})$, in which t is the time, $V_0$ is a base voltage value, $Q_{ref}$ is a reference reactive power value, and $Q_{meas}$ is the measured reactive power. The phase angle set point may be calculated as a function $a(t)=F(A_0, P_{ref}, P_{meas})$, in which t is the time, $A_0$ is a base phase angle value, $P_{ref}$ is the reference power value, and $P_{meas}$ is the measured active power. In various embodiments, the calculation of the various set points may be for no load set points. In various embodiments, the active and/or reactive power reference may be a total load measured by the calculating controller 102, 104a, 104b, or provided by a higher-level controller, such as the microgrid controller 100 to the droop controller master 102 and/or the droop controller slaves 104a, 104b, or the droop controller master 102 to the droop controller slaves 104a, 104b.

In various embodiments, the uninterruptable power module controllers 106a, 106b, may be communicatively connected to any number of uninterruptable power modules 108a, 108b, via communication busses 110f, 110g. For example, the first uninterruptable power module controller 106a may be communicatively connected to a first uninterruptable power module (UPM 1) 108a via a sixth communication bus 110f, and the second uninterruptable power module controller 106b may be communicatively connected to a second uninterruptable power module (UPM 2) 108b via a seventh communication bus 110g. The uninterruptable power module controllers 106a, 106b, may be configured to monitor power source conditions and implement command signal instructions received from the droop controller slaves 104a, 104b, for respective fuel cell system(s) or fuel cell power source(s). Monitoring conditions of the fuel cell power sources may include measuring and/or calculating active power, reactive power, and/or harmonic power for associated fuel cell power sources. In various embodiments, the uninterruptable power module controllers 106a, 106b, may send active power, reactive power, and/or harmonic power for the associated fuel cell power sources to the droop controller slaves 104a, 104b, via the fourth and/or fifth communication busses 110d, 110e. Implementing command signal instructions for the fuel cell power sources may include manipulating configurations of components of associated uninterruptable power modules 108a, 108b, in a manner to cause the uninterruptable power modules 108a, 108b, to perform in accordance with the command signals. In various embodiments, the uninterruptable power module controllers 106a, 106b, may send uninterruptable power module control signals to the associated uninterruptable power modules 108a, 108b, via the sixth and/or seventh communication busses 110f, 100g, with instructions to modify configurations to perform in accordance with the command signals and frequency and/or voltage droop profiles, as discussed further herein. In various embodiments, the uninterruptable power module controllers 106a, 106b, may receive a command signal from the droop controller slaves 104a, 104b, in parallel with at least one other command signal, sending active power, reactive power, and/or harmonic power to the droop controller slaves 104a, 104b, and/or sending at least one control signal to the uninterruptable power modules 108a, 108b.

The examples illustrated in FIG. 1 and described herein are not limiting as to number or arrangement of the components of the network of controllers. Any of the components of the network of controllers may be separate components and/or combined components configured for multiple functions. In various embodiments, the controllers 100, 102, 104a, 104b, 106a, 106b, 108a, 108b, may be a general or special purpose computer or a dedicated control device or circuit. In various embodiments, the communication busses 110a-110g may be wired and/or wireless communication means. The examples illustrated and described herein are disclosed as such for ease of description and understanding.

Figure 2:
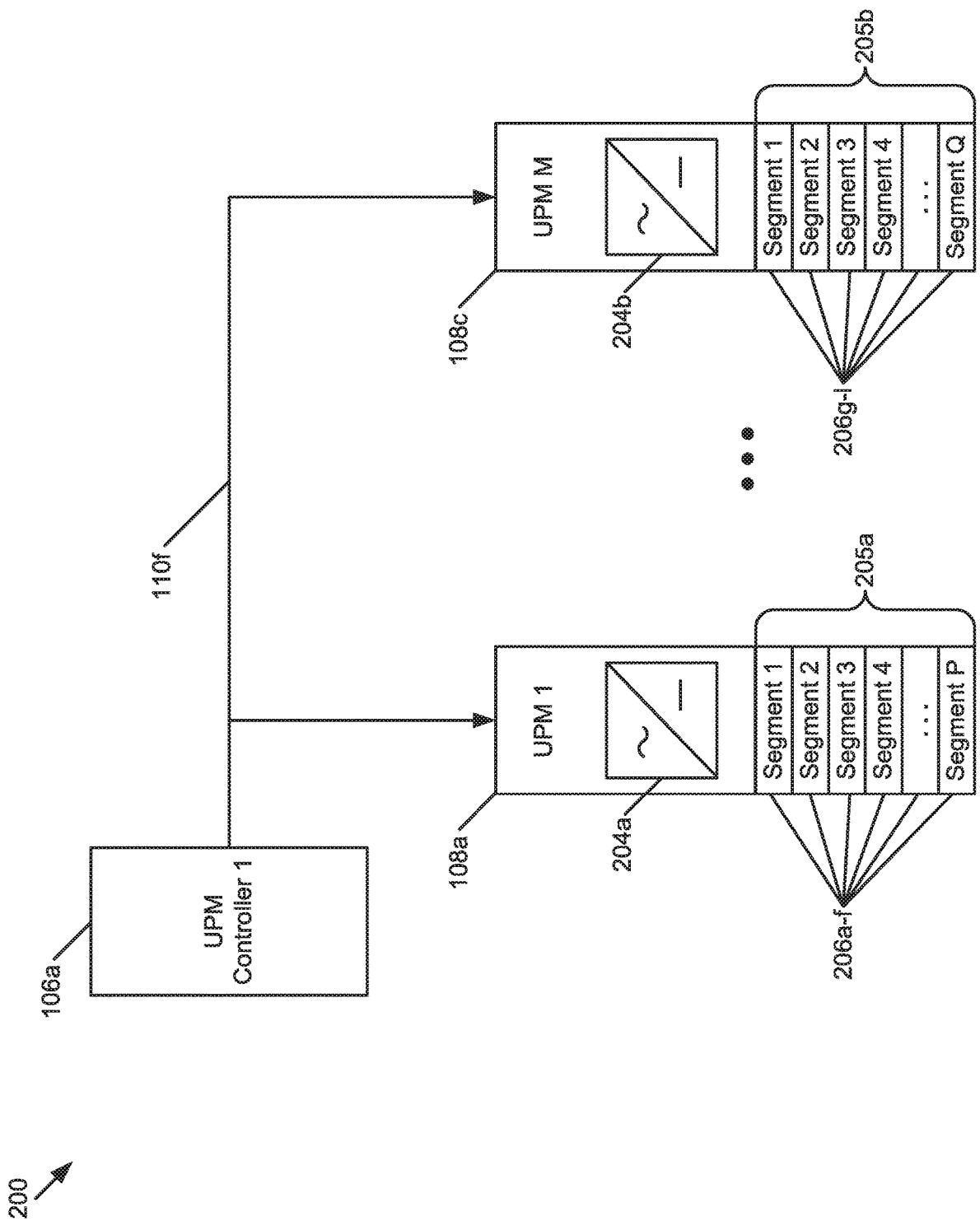
FIG. 2 is a block diagram illustrating a controller networked with uninterruptable power modules of a fuel cell power source having paralleled inputs and paralleled outputs according to an embodiment.

Referring to FIG. 2, an uninterruptable power module controller 106a may be networked with uninterruptable power modules 108a, 108c, of a fuel cell power source 200 having paralleled inputs and paralleled outputs according to an embodiment. Each fuel cell power source 200 contains at least one fuel cell segment as described above. For example, the first uninterruptable power module controller 106a may be communicatively connected to at any number of uninterruptable power modules, such as the first uninterruptable power module 108a and third uninterruptable power module (UPM M) 108c, via any number of communication busses 110f. The uninterruptable power modules 108a, 108c, may each include any number of direct current (DC)/alternating current (AC) inverters 204a, 204b, configured to convert DC power received at a DC side from any number of fuel cell segments 206a, 206b, 206c, 206d, 206e 206f, 206g, 206h, 206i, 206j, 206k, 206l, to AC power output at an AC side.

For example, each fuel cell power source 200 may contain one or more uninterruptable power modules 108a, 108c and/or one or more fuel cell systems 205a, 205b (if the fuel cell systems are not located in UPMs 108a, 108c). Each uninterruptable power module 108a, 108c may contain one or more fuel cell systems 205a, 205b and one or more DC/AC inverters 204a, 204b. Each fuel cell system 205a, 205b may contain one or more fuel cell segments 206a-f and 206g-l and associated balance of plant components such as blowers, pumps, valves, heat exchangers, evaporators, fuel reformers, etc. For example, a fuel cell system 205a, 205b may comprise a hot box containing one to twenty fuel cell segments, such as four to six fuel cell segments. For example, fuel cell segments 206a-f may be located in a first hot box of a first fuel cell system 205a and fuel cell segments 206g-l may be located in a second hot box of a second fuel cell system 205b. The uninterruptable power module controller 106a may be configured to control a set of networked DC/AC inverters 204a, 204b, as a single DC/AC inverter assembly. The uninterruptable power module controller 106a may be configured to establish the loading on each DC/AC inverter 204a, 204b, by sending uninterruptable power module control signals to the uninterruptable power modules 108a, 108c, which may be configured to implement configurations of the DC/AC inverter 204a, 204b, specified by the uninterruptable power module control signals to perform in accordance with command signals received by the uninterruptable power module controller 106a. Example uninterruptable power modules controllers 106a are described regarding the inverter master controller in U.S. Pat. No. 9,362,815 filed on Oct. 24, 2011, entitled "Input-parallel/Output-parallel Inverter Assembly Control Device and Method," herein incorporated by reference in its entirety. Further, example uninterruptable power modules 108a, 108c, and DC/AC inverters 204a, 204b, are also described regarding the inverters in U.S. Pat. No. 9,362,815.

Figure 3:
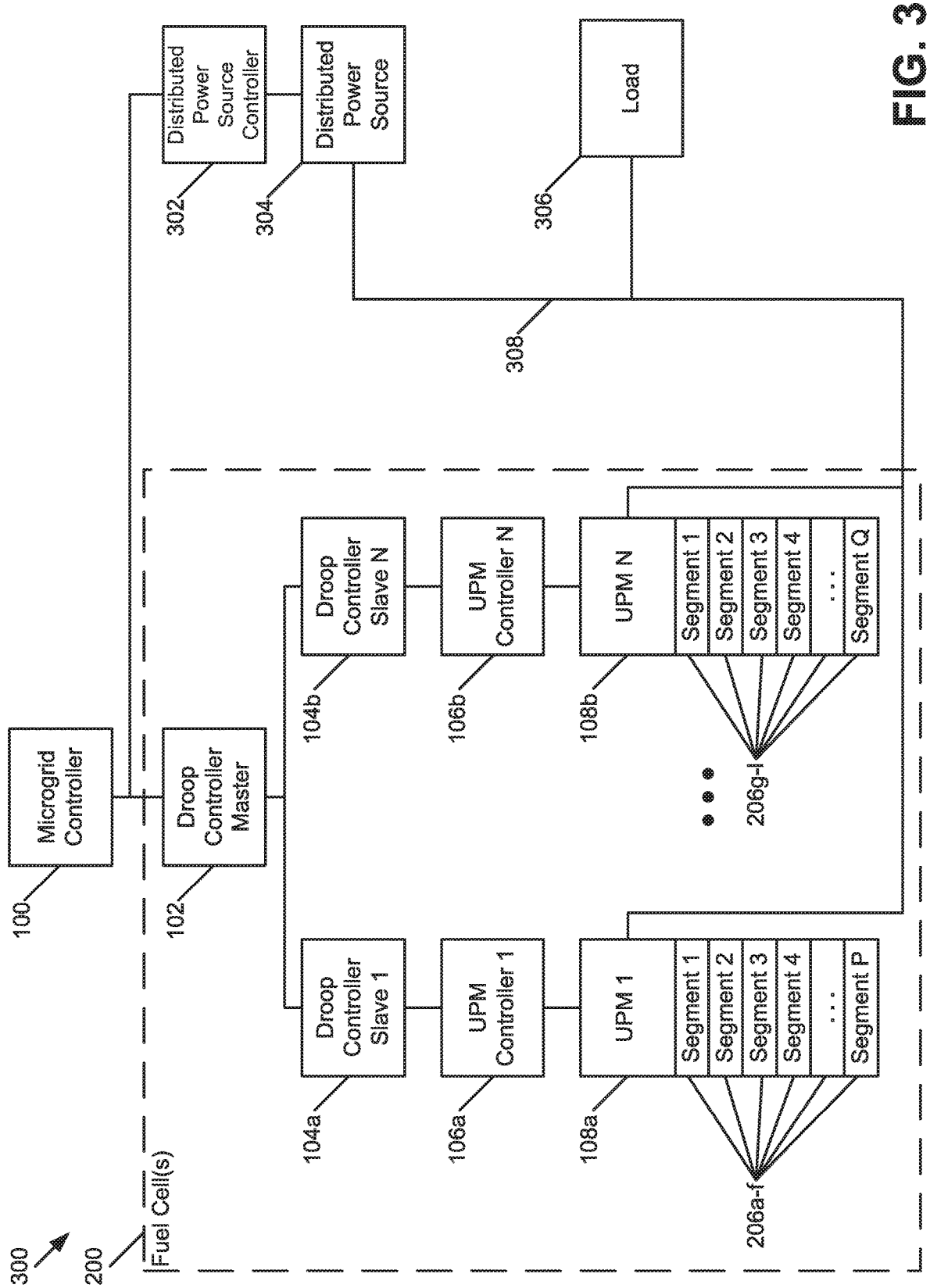
FIG. 3 is a block diagram illustrating a microgrid for a load connected to multiple power sources managed by a network of controllers according to an embodiment.

Referring to FIG. 3, a microgrid 300 may connect a load 306 to multiple power sources, such as any number of fuel cell power sources 200 and/or any number of distributed power sources 304, managed by a network of controllers 100, 102, 104a, 104b, 106a, 106b, according to an embodiment. The microgrid controller 100 may be communicatively connected to at least one fuel cell power source 200 via the communication bus 110a connecting the microgrid controller to the droop controller master 102. The droop controller master 102, any number of droop controller slaves 104a, 104b, any number of uninterruptable power module controllers 106a, any number of uninterruptable power modules 108a, 108b, and any number of fuel cell segments 206a-206l may be communicatively connected as described herein with reference to FIGS. 1 and 2.

The microgrid controller 100 may be communicatively connected to any number of distributed power source controllers 302 via a communication bus, and each distributed power source controller 302 may be communicatively connected to any number of distributed power sources 304. The distributed power sources 304 may include any combination of any number of fuel cell systems, diesel generators, grid connections, micro-turbines, photovoltaic generators, wind generators, etc. In various embodiments, a distributed power source controller 302 may be a droop controller master or slave for a respective one or more distributed power sources 304.

Further, the fuel cell power source 200, and in particular the uninterruptable power modules 108a, 108b of the fuel cell power source 200, at the AC side of the DC/AC inverters 204a, 204b, may be electrically connected to the load 306 via an electrical conduit 308. The distributed power source 304 may also be electrically connected to the load 306 via the electrical conduit 308.

As discussed herein, the various controllers 100, 102, 104a, 104b, 106a, 106b, 302, may be configured to measure active power, reactive power, and/or harmonic power for the various sections of the microgrid 300, such as sections of the microgrid for the various power sources 200, 304, and the load 306 for which the controllers 100, 102, 104a, 104b, 106a, 106b, 302, are configured to monitor. The controllers 100, 102, 104a, 104b, 106a, 106b, 302, may monitor power flow on the electrical conduit 308 between the respective power sources 200, 304, of the controllers 100, 102, 104a, 104b, 106a, 106b, 302, and the load 306.

Referring to FIGS. 4A, 4B, 5A, and 5B, frequency droop profiles 400, 410, and voltage droop profiles 500, 510, may be provided for balancing multiple fuel cell power sources 200 and for balancing fuel cell power sources 200 and other distributed power sources 304 according to various embodiments. Frequency droop profiles 400, 410, may be provided based on a relationship between frequency and power, such as active power or harmonic power, for each of the power sources 200, 304, of the frequency droop profile 400, 410. Voltage droop profiles 500, 510, may be provided based on a relationship between voltage and power, such as reactive power or harmonic power, for each of the power sources 200, 304, of the voltage droop profile 500, 510. The example frequency droop profiles 400, 410, and voltage droop profiles 500, 510, illustrate a potential to provide unbalanced power flow from various power sources 200, 304. The frequency droop profile 400 and the voltage droop profile 500 provide examples for unbalanced power flow from multiple fuel cell systems of a fuel cell power source, in which each fuel cell system is provided with its own uninterruptable power module 108a, 108b, 108c. The frequency droop profile 410 and the voltage droop profile 510 provide examples for unbalanced power flow from multiple power sources including a combination of a fuel cell power source 200 and another distributed power source 304. In various embodiments, the frequency droop profiles 400, 410, and the voltage droop profiles 500, 510, for multiple power sources 200, 304, may be determined by a controller in communication with the multiple power sources, such as the microgrid controller 100, droop controller master 102, and/or the droop controller slave 104a, 104b.

The power sources 200, 304, may be designated as a primary and a secondary power source. The primary power source may be the power source 200, 304, providing the majority of the power for the load among the balanced power sources 200, 304. In other words, the primary power source does not necessarily have to provide the majority of the power for the load among all of the power sources 200, 304 of the microgrid 300 providing power to the load 306, but may be the power source 200, 304, providing the majority of the power among the power sources 200, 304, for the frequency droop profile 400, 410, and the voltage droop profile 500, 510. For example, fuel cell power source 1 may be the primary power source and fuel cell power source 2 may be the secondary power source for the frequency droop profile 400 and the voltage droop profile 500. Then, for the frequency droop profile 410 and the voltage droop profile 510, a fuel cell power source including both fuel cell power source 1 and fuel cell power source 2 may be the primary power source and a distributed power source 304, such as a generator, may be the secondary power source, even though fuel cell power source 2 on its own is a secondary power source of the frequency droop profile 400 and the voltage droop profile 500. In various embodiments, various criteria or combinations of criteria, such as power potential, preference, efficiency, age, operating time, environment, condition, distance, etc., may be used to determine which power source 200, 304, is a primary power source and a secondary power source.

To determine an unequal balance of power between multiple power sources 200, 304, as in the example frequency droop profiles 400, 410, and the example voltage droop profiles 500, 510, a reference power provided to the droop controller master or slave 102, 104a, 104b, for the secondary power source can be modified based on the energy available from the secondary power source.

Figure 4A:
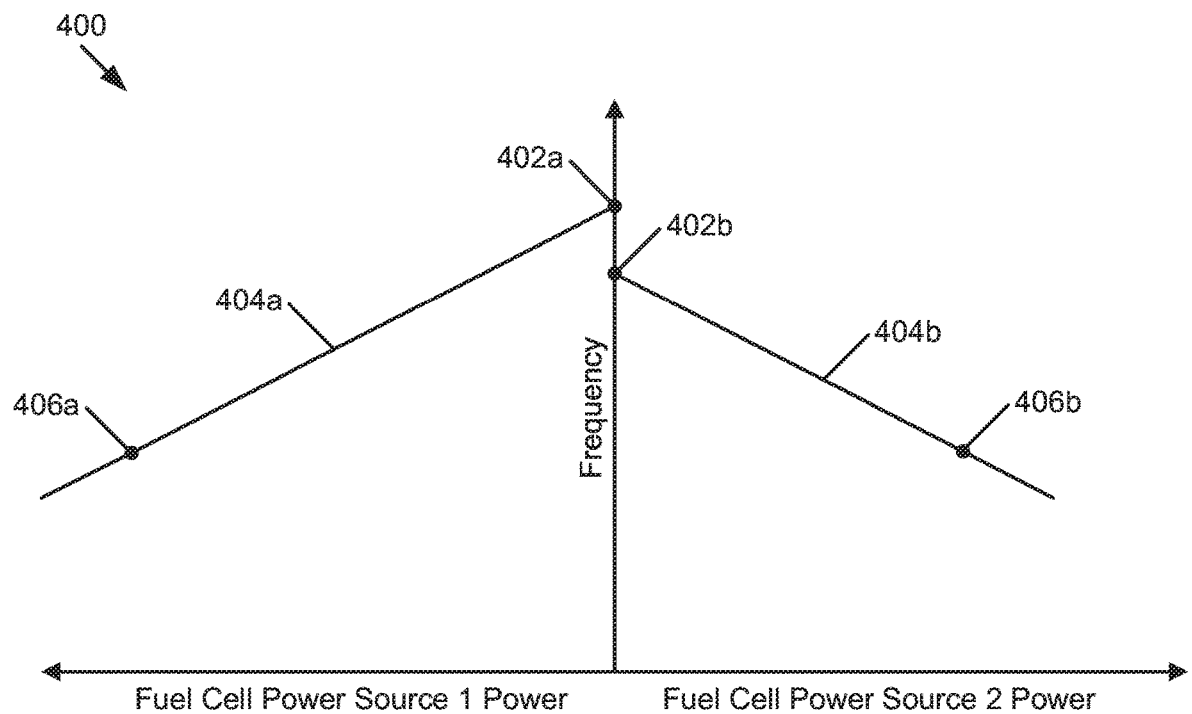
FIGS. 4A and 4B are graph diagrams illustrating example frequency droop profiles for balancing multiple fuel cell power sources and for balancing fuel cell power sources and other power sources according to various embodiments.

Referring to FIG. 4A, the example frequency droop profile 400 may be for multiple fuel cell power sources 200 or fuel cell systems (e.g., 205a, 205b) in which one (or one set) has greater power potential than another (or another set). For example, fuel cell power source 1 may have greater power potential than fuel cell power source 2 for a variety of reasons, including equipment and/or environmental reasons (e.g., fuel cell power source 1 may have a newer fuel cell system than fuel cell power source 2). Because fuel cell power source 2 has lower power potential than fuel cell power source 1, fuel cell power source 1's no load set point 402a is set to a higher frequency than fuel cell power source 2's no load set point 402b. As a result, the balance of the droop control load sharing may place the majority of the load on fuel cell power source 1 (e.g., 60%) and less of the load on fuel cell power source 2 (e.g., 40%). As the load demand increases, the frequency for both the fuel cell power source 1 and the fuel cell power source 2 may decrease proportionally to each other and along the frequency droop profiles, frequency droop profile 404a for fuel cell power source 1 and frequency droop profile 404b for fuel cell 2, at various points, such as point 406a, 406b, the fuel cell power source 1 and the fuel cell power source 2 may output greater amounts of power in the same proportion as originally set. Thus, in this embodiment, both frequency droop profiles 404a and 404b comprise lines having the same slope but different no load set points 402a, 402b. However, with multiple fuel cell power sources 200 or fuel cell systems in parallel, if one fuel cell power sources 200 or fuel cell system faults, the droop control may automatically result in a shift of load to the remaining fuel cell power sources 200 or fuel cell systems. This may result in a lower than desired frequency for the fuel cell power sources 200 or fuel cell systems. The droop controller master or slave 102, 104a, 104b, may then adjust the no load set point of the fuel cell power sources 200 or fuel cell systems on a longer timescale to restore intended frequency.

Figure 4B:
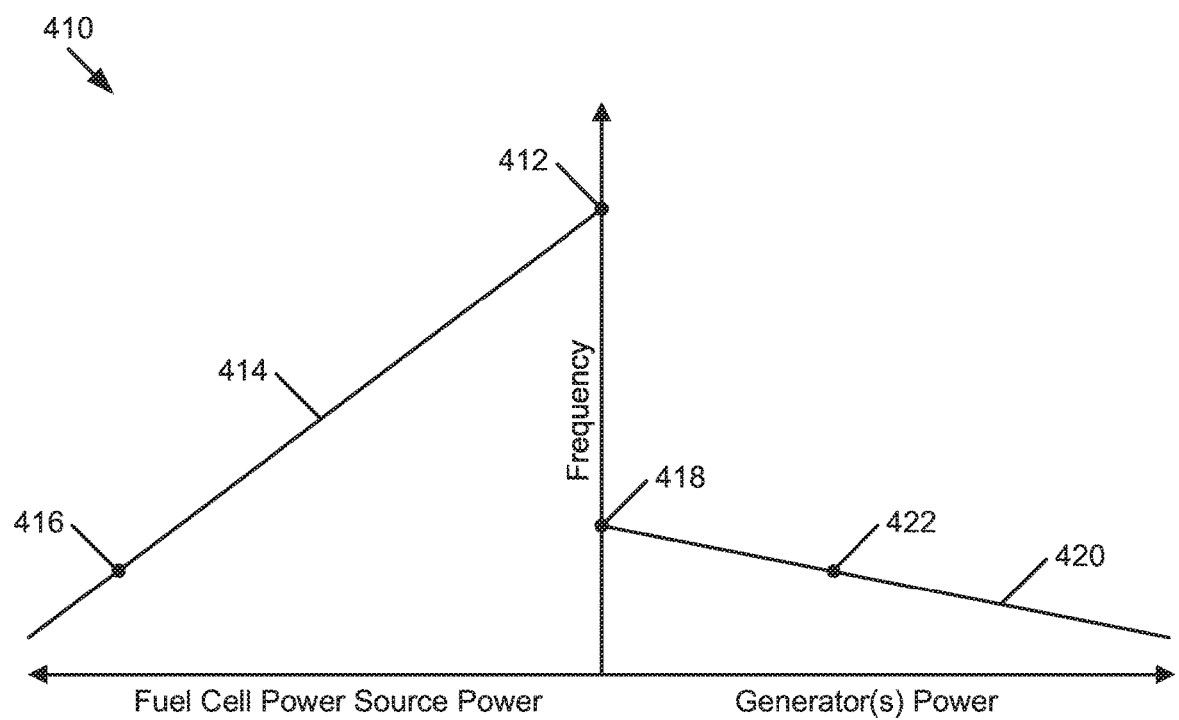

Referring to FIG. 4B, the example frequency droop profile 410 may be for any number of fuel cell power sources 200 or fuel cell systems and any number of distributed power sources 304, such as a generator. In various embodiments, a frequency droop profile may be for any combination of two single power sources 200, 304, a single power source 200, 304, and multiple power sources 200, 304, grouped together as if they comprise a single power source 200, 304, or two groups of multiple power sources 200, 304, each grouped together as if they comprise two single power sources 200, 304. It is not necessary for a group of power sources 200, 304, to include only one type of power source 200, 304.

In examples providing frequency droop profiles for fuel cell power sources 200 and other distributed power sources 304, the droop controller master 102 may determine the no load set points for the fuel cell power source 200 and the microgrid controller 100 may determine the no load set points for the distributed power source 304. In determining the no load set points, the microgrid controller 100 and the droop controller master 102 may communicate to share available power of the power sources 200, 304, and no load set point commands, including the voltage commands, the frequency commands, and/or the phase angle commands. Thus, each fuel cell power source 200 has a separate droop controller slave which is responsible for control of the specific power source 200, while the droop control master controls the various droop controller slaves.

In an example, the frequency droop profile 410 may include a single fuel cell power source 200 and a single generator, a group of fuel cell power sources 200 and a single generator, a single fuel cell power sources 200 and a group of generators, or a group of fuel cell power sources 200 and a group of generators. For any combination of single and/or multiple power sources 200, 304, one single or group of power sources 200, 304, may have greater power potential than the other. For example, the fuel cell power source may have greater power potential than the generator of frequency droop profile 410 for a variety of reasons, including equipment and/or environmental reasons. Because the generator has lower power potential than the fuel cell power source, the fuel cell power source's no load set point 412 is set to a higher frequency than the generator's no load set point 418. As a result, the balance of the droop control load sharing may place the majority of the load on the fuel cell power source (e.g., 80%) and less of the load on the generator (e.g., 20%). As the load demand increases, the frequency for both the fuel cell power source and the generator may decrease proportionally to each other and along the frequency droop profiles, frequency droop profile for the fuel cell power source 414 and frequency droop profile for the generator 420, at various points, such as point 416, 422, the fuel cell power source and the generator may output greater amounts of power in the same proportion as originally set. However, with multiple power sources 200, 304, in parallel, a power source may report reduced capacity. For example, a fuel cell power source 200 may fault, and another fuel cell power source 200 may take the load of the faulty fuel cell power sources 200, resulting in the fuel cell frequency set point to be adjusted lower by the droop master controller 102. As a result, the droop control may automatically result in a shift of load to the generator. Based on communications between the microgrid controller 100 and the droop controller master 102, the shift in load could be maintained or shifted. For example, if the fuel cell power source has capacity without the faulty fuel cell power source to support the designated amount of the load, and fuel level is low for the generator, the no load set point of the fuel cell power source could be shifted higher to put load back on to the fuel cell power source. Or, if the fuel cell power source does not have capacity without the faulty fuel cell power source to support the designated amount of the load, and the generator has sufficient fuel, the fuel cell power source no load set point could be maintained or lowered.

Figure 5A:
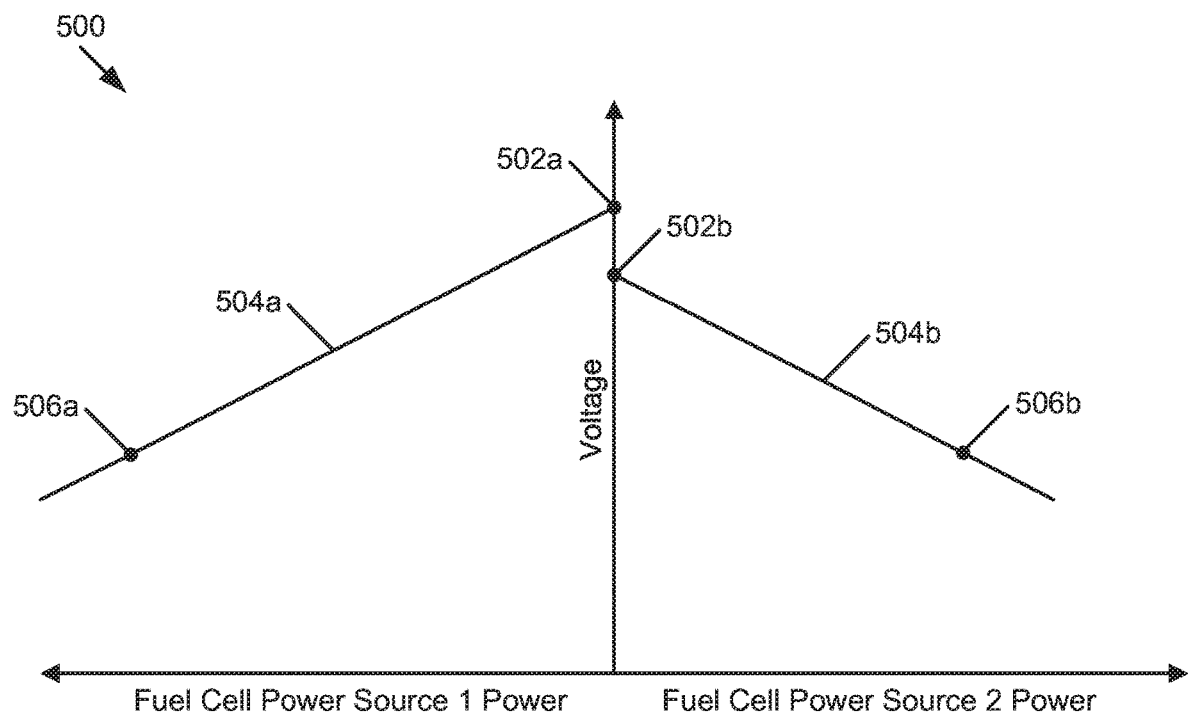
FIGS. 5A and 5B are graph diagrams illustrating example voltage droop profiles for balancing multiple fuel cell power sources and for balancing fuel cell power sources and other power sources according to various embodiments.

Referring to FIG. 5A, the example voltage droop profile 500 may be for multiple fuel cell power sources 200 or fuel cell systems in which one has greater power potential than the other. For example, fuel cell power source 1 may have greater power potential than fuel cell power source 2 for a variety of reasons, including equipment and/or environmental reasons. Because fuel cell power source 2 has lower power potential than fuel cell power source 1, fuel cell power source 1's no load set point 502a is set to a higher voltage than fuel cell power source 2's no load set point 502b. As a result, the balance of the droop control load sharing may place the majority of the load on fuel cell power source 1 (e.g., 60%) and less of the load on fuel cell power source 2 (e.g., 40%). As the load demand increases, the voltage for both the fuel cell power source 1 and the fuel cell power source 2 may decrease proportionally to each other and along the voltage droop profiles, voltage droop profile 504a for fuel cell power source 1 and voltage droop profile 504b for fuel cell power source 2, at various points, such as point 506a, 506b, the fuel cell power source 1 and the fuel cell power source 2 may output greater amounts of power in the same proportion as originally set. However, with multiple fuel cell power sources 200 or fuel cell systems in parallel, if one fuel cell power sources 200 or fuel cell system faults, the droop control may automatically result in a shift of load to the remaining fuel cell power sources 200 or fuel cell systems. This may result in a lower than desired voltage for the fuel cell power sources 200 or fuel cell systems. The droop controller master or slave 102, 104a, 104b, may then adjust the no load set point of the fuel cell power sources 200 or fuel cell systems on a longer timescale to restore intended voltage.

Figure 5B:
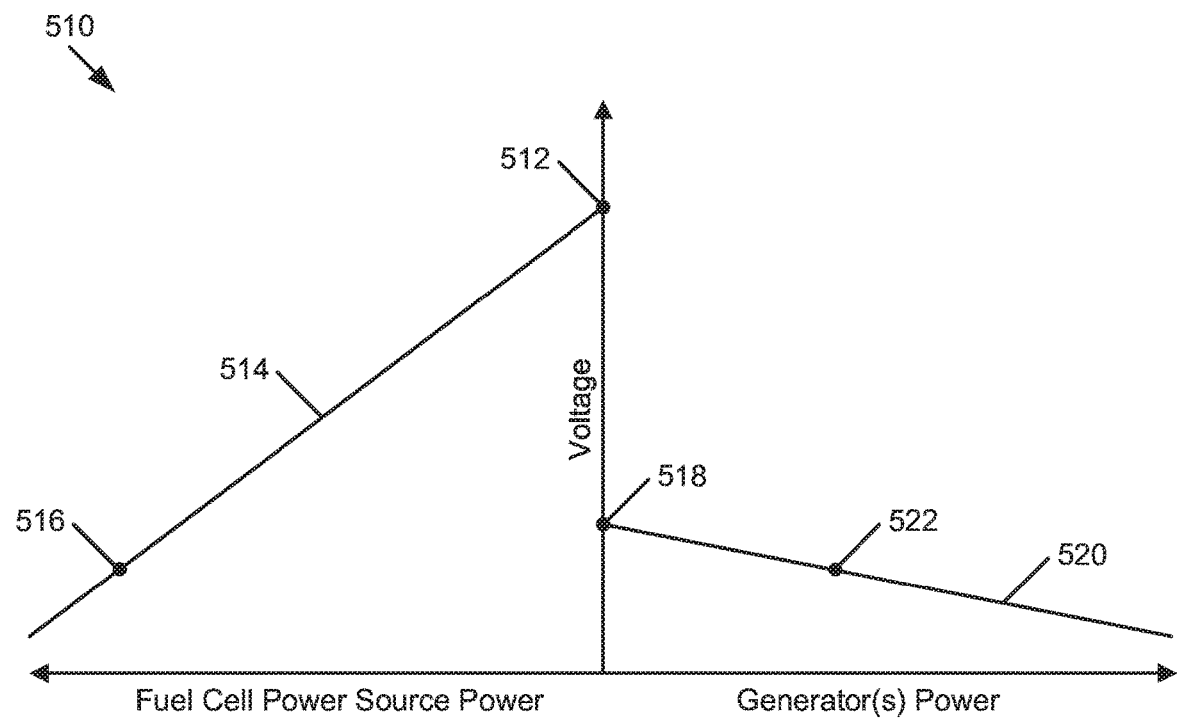

Referring to FIG. 5B, the example voltage droop profile 510 may be for any number of fuel power sources 200 or fuel cell systems and any number of distributed power sources 304, such as a generator. In various embodiments, a voltage droop profile may be for any combination of two single power sources 200, 304, a single power source 200, 304, and multiple power sources 200, 304, grouped together as if they comprise a single power source 200, 304, or two groups of multiple power sources 200, 304, each grouped together as if they comprise two single power sources 200, 304. It is not necessary for a group of power sources 200, 304, to include only one type of power source 200, 304. Thus, in this embodiment, both voltage droop profiles 504a and 504b comprise lines having the same slope but different no load set points 502a, 502b.

In examples providing voltage droop profiles for fuel cell power sources 200 and other distributed power sources 304, the droop controller master 102 may determine the no load set points for the fuel cell power source 200 and the microgrid controller 100 may determine the no load set points for the distributed power source 304. In determining the no load set points, the microgrid controller 100 and the droop controller master 102 may communicate to share available power of the power sources 200, 304, and no load set point commands, including the voltage commands, the frequency commands, and/or the phase angle commands.

In an example, the voltage droop profile 510 may include a single fuel cell power sources 200 and a single generator, a group of fuel cell power sources 200 and a single generator, a single fuel cell power sources 200 and a group of generators, or a group of fuel cell power sources 200 and a group of generators. For any combination of single and/or multiple power sources 200, 304, one single or group of power sources 200, 304, may have greater power potential than the other. For example, the fuel cell power source may have greater power potential than the generator of voltage droop profile 510 for a variety of reasons, including equipment and/or environmental reasons. Because the generator has lower power potential than the fuel cell power source, the fuel cell power source's no load set point 512 is set to a higher voltage than the generator's no load set point 518. As a result, the balance of the droop control load sharing may place the majority of the load on the fuel cell power source (e.g., 80%) and less of the load on the generator (e.g., 20%). As the load demand increases, the voltage for both the fuel cell power source and the generator may decrease proportionally to each other and along the voltage droop profiles, voltage droop profile for the fuel cell power source 514 and voltage droop profile for the generator 520, at various points, such as point 516, 522, the fuel cell power source and the generator may output greater amounts of power in the same proportion as originally set. However, with multiple power sources 200, 304, in parallel, a power source may report reduced capacity. For example, a fuel cell power source 200 may fault, and another fuel cell power sources 200 may take the load of the faulty fuel cell power sources 200, resulting in the fuel cell power source voltage set point to be adjusted lower by the droop master controller 102. As a result, the droop control may automatically result in a shift of load to the generator. Based on communications between the microgrid controller 100 and the droop controller master 102, the shift in load could be maintained or shifted. For example, if the fuel cell power source has capacity without the faulty fuel cell power source to support the designated amount of the load, and fuel level is low for the generator, the no load set point of the fuel cell power source could be shifted higher to put load back on to the fuel cell power source. Or, if the fuel cell power source does not have capacity without the faulty fuel cell power source to support the designated amount of the load, and the generator has sufficient fuel, the fuel cell power source no load set point could be maintained or lowered.

Figure 6:
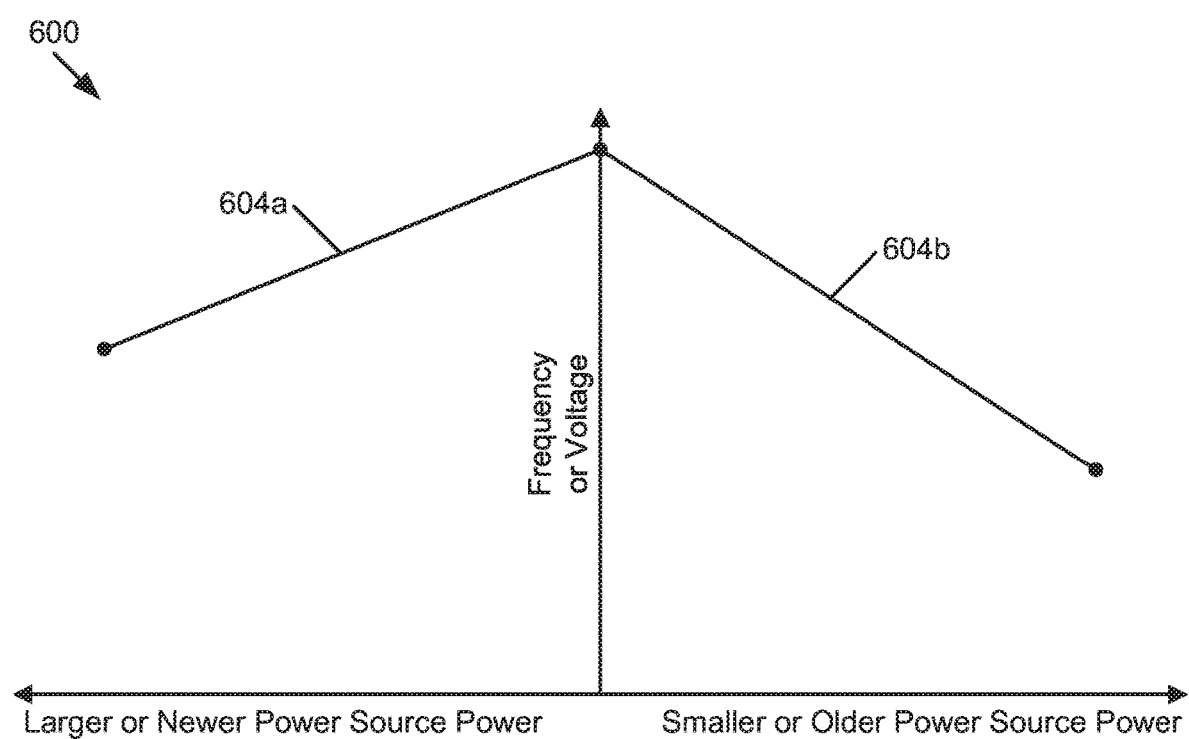
FIG. 6 is a graph diagram illustrating examples of changes in frequency droop profiles according to various embodiments.

Rather than using a different no load set point and the same droop profile slope for difference power sources, as described above with respect to FIGS. 4a to 5b, in another embodiment the droop profile slope is different for different power sources as shown in FIG. 6. In this embodiment, the no load set point can be the same or different for the different power sources.

A frequency profile 600 illustrates an example embodiment with different frequency and/or voltage droop profile slope. For example, a larger capacity distributed power source 304, such as a generator, may have a 1 MW capacity set with a frequency droop profile 604a with a shallow droop (e.g., 0.1 Hz per 100 kW), while a smaller capacity distributed power source may have a 400 kW capacity set with a frequency droop profile 404b with a steeper droop (e.g., a steeper slope, such as 0.5 Hz per 100 kW). In this example, the no load set point 602 is the same for both generators.

In an example for fuel cell power sources 200, the a newer fuel cell power source 200 may have a higher overload capacity and may be set with a frequency droop profile 604a with a shallow droop (e.g., 0.1 Hz per 100 kW), while an older fuel cell power source 200 nearing replacement could be set with a frequency droop profile 604b with a steeper droop (e.g., higher slope, such as 0.5 Hz per 100 kW).

By adjusting gains or droop factor to make the droop of a frequency or voltage droop profile steeper or shallower, the ability of the microgrid controller 100 or the droop controller master 102 to shift load between power sources 200, 304, may not be impacted and may still allow for full management of the load. However, steeper gain or droop factor settings may result in faster unloading in the event of an abrupt degradation transient.

Thus, as described above, at least one of the second slope of the second droop profile 604b and the second no load set point 402b of the second droop profile 404b for the second power source are different from the respective first slope of the first droop profile 604a and the first no load set point 402a of the first droop profile 404a for the first fuel cell power source. The first and the second droop profiles are functions of AC frequency (or voltage) versus power output by the respective first and second inverters of each respective power source.

In various embodiments, the microgrid controller 100 and the droop controller master 102 may be configured to make further adjustments to the frequency and/or voltage droop profiles for the fuel cell power sources 200. The droop factor of the frequency and/or voltage droop profiles may be reduced (e.g., lower no load set point and/or steeper slope) while power sources 200, 304 are heating up to a steady state operating temperature. The droop factor may be increased (e.g., higher no load set point and/or shallower slope) when the fuel cell power sources 200 reach steady state operating temperature (e.g., above 700° C., such as 725 to 950° C.). Thus, the slope of the first droop profile may be decreased (e.g., made more horizontal) as the fuel cell power source 200 heats up from start up to a steady state operating temperature In another embodiment, the frequency and/or voltage droop profile may be non-linear such that at lower loads the droop factor may be greater resulting in a steeper or shallower slope of the droop profile than at higher loads. Non-linear frequency and/or voltage droop profiles may help to implement the ability or disability of the power sources 200, 304, to take on added load. Non-linear frequency and/or voltage droop profiles may protect the power sources 200, 304, from load at different operating points.

Figure 7:
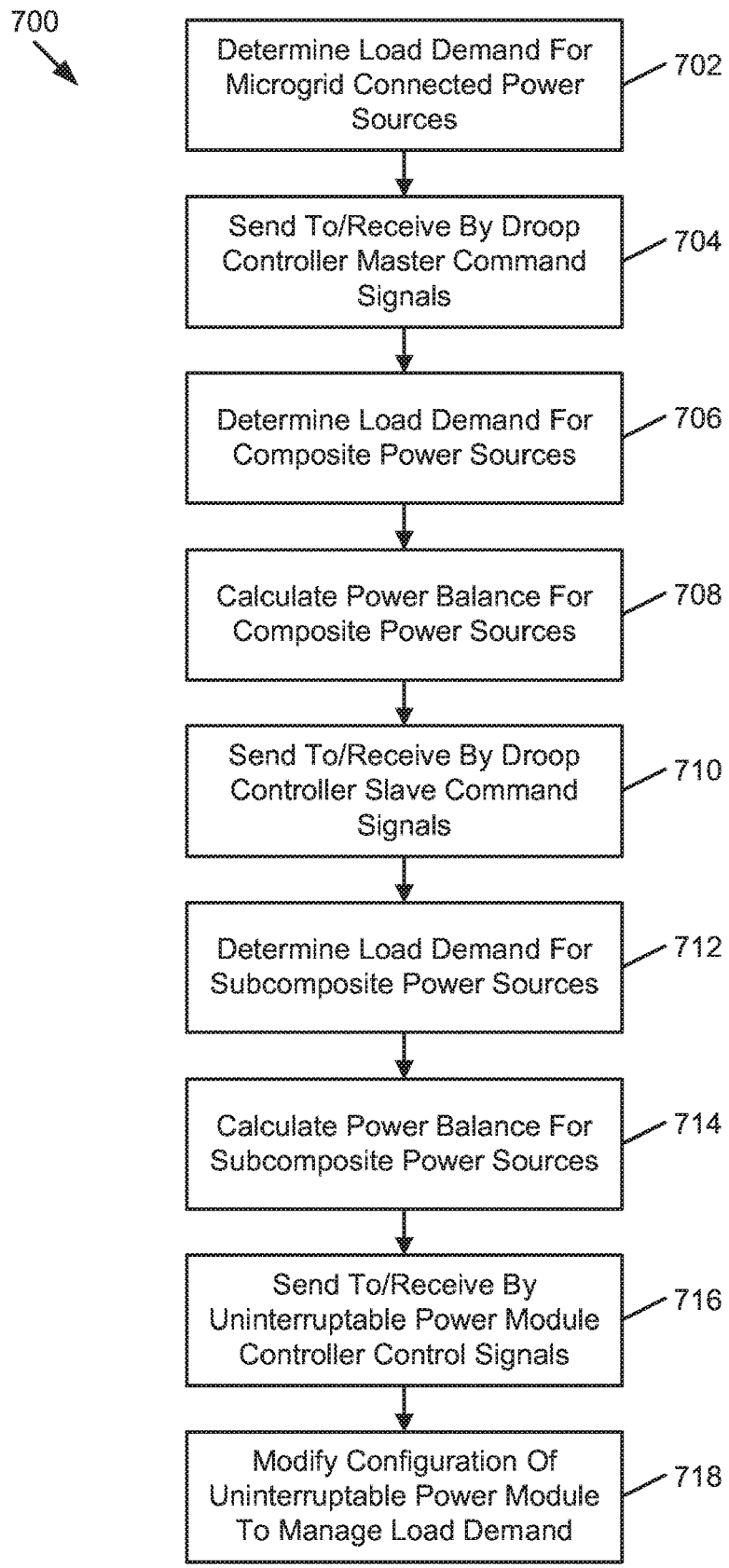
FIG. 7 is a process flow diagram illustrating an example method for implementing parallel operation of multiple uninterruptable power modules controlled fuel cell power sources according to various embodiments.

Referring to FIG. 7, an example method 700 is provided for implementing parallel operation of multiple uninterruptable power module controlled fuel cell power sources according to various embodiments. In various embodiments, the method 700 may be implemented by any one or combination of general purpose hardware (such as a central processing unit (CPU)), specialized hardware (such as an application specific controller), software, firmware, and/or general purpose and/or specialized hardware configured with instructions for implementing the method 700. For ease of explanation and understanding, the term "processing device" is used herein interchangeably with any of the means for implementing the method 700.

In block 702, the processing device (e.g., the microgrid controller 100) may determine load demand for microgrid connected power sources 200, 304. The processing device may be configured to measure and/or calculate the power draw of the load 306 on the power sources 200, 304, of the microgrid 300. In various embodiments, the processing device may receive measurements and/or calculations of the power draw of the load 306 on the power sources 200, 304, from processing devices (e.g., the droop control master and/or slaves 102, 104a, 104b), and use the received measurements in determining the load demand for the microgrid connected power sources 200, 304.

In block 704, the processing device (e.g., the microgrid controller 100) may send command signals and the processing device (e.g., the droop controller master 102) may receive the command signals. As discussed herein the command signals may include a power command, a voltage command, a frequency command, and/or a phase angle command. The command signals may be used to determine set points for configuring the power sources 200, 304, to balance the load demand among the microgrid connected power sources 200, 304.

In block 706, the processing device (e.g., the droop controller master 102) may determine load demand for a composite power source 200 associated with the processing device. A composite power source 200 may be a fuel cell power source having multiple fuel cell systems, for which each fuel cell system may be further associated with a processing device (e.g., the droop controller slave 104a, 104b, and/or the uninterruptable power module 108a, 108b, 108c). The processing device may be configured to measure and/or calculate the power draw of the load 306 on the composite power source 200.

In block 708, the processing device (e.g., the droop controller master 102) may calculate a power balance for the composite power source 200. In various embodiments, calculating the power balance may involve using the received command signals, which may represent the load demand for the power source 200, 304, associated with the processing device, in combination with measurements and/or calculations of the power capacity of the composite power source 200 to determine the frequency and/or voltage profile for the composite power source 200. In various embodiments, the processing device may receive measurements and/or calculations of the power draw of the load 306 on the microgrid power sources 200, 304, from processing devices (e.g., the microgrid controller 100 and/or the droop controller slaves 104a, 104b), and use the received measurements in determining the load demand for the composite power source 200.

In block 710, the processing device (e.g., the droop controller master 102) may send command signals and the processing device (e.g., the droop controller slave 104a, 104b) may receive the command signals. As discussed herein the command signals may include a voltage command, a frequency command, and/or a phase angle command. The command signals may be used to determine set points for configuring the composite power sources 200 to balance the load demand among the microgrid connected power sources 200, 304.

In block 712, the processing device (e.g., the droop controller slave 104a, 104b) may determine load demand for a subcomposite power source 200 associated with the processing device. A subcomposite power source 200 may be a fuel cell system of a composite power source 200 such as the fuel cell power source, for which the fuel cell system may be further associated with a processing device (e.g., the droop controller slave 104a, 104b, and/or the uninterruptable power module 108a, 108b, 108c). The processing device may be configured to measure and/or calculate the power draw of the load 306 on the subcomposite power source 200.

In block 714, the processing device (e.g., the droop controller slave 104a, 104b) may calculate a power balance for the subcomposite power source 200. In various embodiments, calculating the power balance may involve using the received command signals, which may represent the load demand for the power source 200, 304, associated with the processing device, in combination with measurements and/or calculations of the power capacity of the subcomposite power source 200 to determine the frequency and/or voltage profile for the subcomposite power source 200. In various embodiments, the processing device may receive measurements and/or calculations of the power draw of the load 306 on the microgrid power sources 200, 304, from processing devices (e.g., the microgrid controller 100 and/or the droop control master 102), and use the received measurements in determining the load demand for the subcomposite power source 200.

In block 716, the processing device (e.g., the droop controller slave 104*a*, 104*b*) may send control signals and the processing device (e.g., the uninterruptable power module 108*a*, 108*b*, 108*c*) may receive the control signals. As discussed herein the control signals may include instructions to modify configurations to perform in accordance with the command signals and frequency and/or voltage droop profiles. The control signals may be used to specify set points for configuring the uninterruptable power modules 108*a*, 108*b*, 108*c*, including their DC/AC inverters 204*a*, 204*b*, to balance the load demand among the microgrid connected power sources 200, 304.

In block 718, the processing device (e.g., the droop controller slave 104*a*, 104*b*) may modify a configuration of the uninterruptable power module 108*a*, 108*b*, 108*c*, including their DC/AC inverters 204*a*, 204*b*, to manage load demand in accordance with the received command signals and/or frequency and/or voltage droop profile.

In various embodiments, each of the blocks 702-718 may be repeatedly and/or continuously implemented in conjunction and/or independently of implementation of any of the other blocks 702-718. In this manner, the method 700 may be implemented for initial setting of configurations of the uninterruptable power modules 108*a*, 108*b*, 108*c*, and updating the configurations of the uninterruptable power modules 108*a*, 108*b*, 108*c*, periodically, continuously, and/or in response to changes in the microgrid 300.

While many embodiments were described above, each feature or step of any embodiment may be used in combination with one or more features or steps of one or more other embodiments in any suitable combination.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments.

The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A method of parallel operation of multiple power sources, comprising:
   measuring, by a droop controller master, a load demand for the multiple power sources;
   receiving, by a first droop controller slave from the droop controller master, the load demand for the multiple power sources;
   determining, by the first droop controller slave, a power capacity of a first fuel cell power source of the multiple power sources;

calculating, by the first droop controller slave, at least one of a first slope and a first no load set point for a first droop profile for the first fuel cell power source using the load demand for the multiple power sources and the power capacity of the first fuel cell power source, wherein the first droop profile and at least a second droop profile for a second power source provide for all of the load demand for the multiple power sources; and configuring a first inverter for the first fuel cell power source to output power according to the first droop profile.

2. The method of claim 1, wherein the second power source comprises a second fuel cell power source.

3. The method of claim 2, further comprising receiving, by a second droop controller slave from the droop controller master, the load demand for the multiple power sources;

determining, by the second droop controller slave, a power capacity of the second fuel cell power source of the multiple power sources;

calculating, by the second droop controller slave, at least one of a second slope and a second no load set point for the second droop profile for the second fuel cell power source using the load demand for the multiple power sources and the power capacity of the second fuel cell power source; and configuring a second inverter for the second fuel cell system to output power according to the second droop profile.

4. The method of claim 3, wherein:

at least one of the second slope and the second no load set point are different from the respective first slope and the first no load set point; and the first and the second droop profiles are functions of AC frequency versus power output by the respective first and second inverters.

5. The method of claim 4, further comprising decreasing the first slope of the first droop profile as the first fuel cell power source heats up from start up to steady state operating temperature.

6. The method of claim 4, wherein:

the first fuel cell power source comprises a first uninterruptible power module containing the first inverter and at least one first fuel cell system comprising at least one first fuel cell segment; and the second fuel cell power source comprises a second uninterruptible power module containing the second inverter and at least one second fuel cell system comprising at least one second fuel cell segment.

7. The method of claim 1, wherein the second power source comprises a distributed power generator.

8. The method of claim 7, further comprising:

measuring, by a microgrid controller, a load demand for a microgrid; and receiving, by the droop controller master from the microgrid controller, the load demand for the microgrid, wherein measuring the load demand for the multiple power sources comprises measuring the load demand for the multiple power sources as a first portion of the load demand for the microgrid.

9. The method of claim 8, further comprising:

receiving, by a controller from the microgrid controller, the load demand for the microgrid;

determining, by the controller, a power capacity of the distributed power generator; and calculating, by the controller, at least one of a second slope and a second no load set point for a second droop profile for the distributed power generator using the load demand for the distributed power generator as a second portion of the load demand for the microgrid and the power capacity of the distributed power generator, wherein the first droop profile and at least the second droop profile for the distributed power generator provide for all of the load demand for the microgrid.

10. The method of claim 8, wherein the distrusted power generator comprises at least one of a fuel cell system, a diesel generator, a grid connection, a micro-turbine, a photovoltaic generator, and a wind generator.

11. An apparatus for parallel operation of multiple power sources, comprising:

a droop controller master communicatively connected to the multiple power sources and configured to measure a load demand for the multiple power sources;

a first droop controller slave communicatively connected to the droop controller master and to a first fuel cell power source of the multiple power sources, the first droop controller configured to calculate a first droop profile for the first fuel cell power source;

a second droop controller slave communicatively connected to the droop controller master and to a second power source; and a first inverter, electrically connected to the first fuel cell power source and communicatively connected to the first droop controller slave, and configured to output power according to a first droop profile.

12. The apparatus of claim 11, wherein the first droop controller slave is configured to:

receive from the droop controller master, the load demand for the multiple power sources;

determine a power capacity of the first fuel cell power source of the multiple power sources; and calculate at least one of a first slope and a first no load set point for a first droop profile for the first fuel cell power source using the load demand for the multiple power sources and the power capacity of the first fuel cell power source, wherein the first droop profile and at least a second droop profile for the second power source provide for all of the load demand for the multiple power sources.

13. The apparatus of claim 12, wherein:

the second power source comprises a second fuel cell power source; and the second droop controller slave is configured to:

receive from the droop controller master, the load demand for the multiple power sources;

determine, a power capacity of the second fuel cell power source of the multiple power sources; and calculate at least one of a second slope and a second no load set point for the second droop profile for the second fuel cell power source using the load demand for the multiple power sources and the power capacity of the second fuel cell power source; and a second inverter for the second fuel cell system is configured to output power according to the second droop profile.

14. The apparatus of claim 13, wherein:

at least one of the second slope and the second no load set point are different from the respective first slope and the first no load set point; and the first and the second droop profiles are functions of AC frequency versus power output by the respective first and second inverters.

15. The apparatus of claim 14, wherein the first droop controller slave is further configured to decrease the first slope of the first droop profile as the first fuel cell power source heats up from start up to steady state operating temperature.

16. The apparatus of claim 14, wherein:
the first fuel cell power source comprises a first uninterruptible power module containing the first inverter and at least one first fuel cell system comprising at least one first fuel cell segment; and
the second fuel cell power source comprises a second uninterruptible power module containing the second inverter and at least one second fuel cell system comprising at least one second fuel cell segment.

17. The apparatus of claim 11, wherein the second power source comprises a distributed power generator.

18. The apparatus of claim 17, wherein the distrusted power generator comprises at least one of a fuel cell system, a diesel generator, a grid connection, a micro-turbine, a photovoltaic generator, and a wind generator.

19. An apparatus for parallel operation of multiple power sources, comprising:
a first means for measuring a load demand for the multiple power sources;
a second means for:
  receiving from the first means the load demand for the multiple power sources;
  determining a power capacity of a first fuel cell power source of the multiple power sources; and
  calculating at least one of a first slope and a first no load set point for a first droop profile for the first fuel cell power source using the load demand for the multiple power sources and the power capacity of the first fuel cell power source, wherein the first droop profile and at least a second droop profile for a second power source provide for all of the load demand for the multiple power sources; and
a third means for outputting AC power from the first fuel cell power source according to the first droop profile.

20. The apparatus of claim 19, wherein the second power source comprises a second fuel cell power source or a distributed power generator.

* * * * *